Nov. 12, 1963  A. A. BROWN  3,110,800
TRUE AIR SPEED COMPUTER
Filed May 25, 1960  2 Sheets-Sheet 2

A. A. BROWN
INVENTOR

ATTORNEYS

United States Patent Office  3,110,800
Patented Nov. 12, 1963

3,110,800
TRUE AIR SPEED COMPUTER
Alastair A. Brown, Kelvin Works, Kelvin Avenue,
Hillington, Glasgow S.W. 2, Scotland
Filed May 25, 1960, Ser. No. 31,591
Claims priority, application Great Britain June 3, 1959
7 Claims. (Cl. 235—151)

This invention relates to computing apparatus. The main object of the invention is to provide means capable of giving an accurate true air speed capable of operating over the following ranges:

Altitude _____ 0–60,000 ft.
Indicated air speed _____ 100 to 600 knots.
Mach number _____ To a maximum of 1.2 M.

These ranges can even be extended if the operation of the aircraft warrants such an extension.

The invention may include means to compensate for position error effects.

True air speed is most conveniently expressed as a function of Mach number and temperature by the following formulae:

$$V_T \sim M\sqrt{T}$$

i.e.
$$V_T = CM\sqrt{T} \qquad (1)$$

where $M$ = Mach number
$T$ = free airstream temperature
$C$ = constant

The free airstream temperature can be derived as follows:

$$T = \frac{T_i}{1 + M^2 K} \qquad (2)$$

where $T_i$ = indicated stagnation temperature
$K$ = a constant. At a stagnation point $K$ = 0.2, but otherwise is dependent on the recovery factor of the temperature probe Combining Equations 1 and 2 we get:

$$V_T = C\sqrt{\frac{M^2 T_i}{1 + M^2 K}} \qquad (3)$$

which can be more conveniently expressed as:

$$V_T = CF(M)\sqrt{T_i} \qquad (4)$$

where $$F(M) = \sqrt{\frac{M^2}{1 + M^2 K}} \qquad (4a)$$

In addition Mach number can be expressed as a function of the ratio $$\left(\frac{P-S}{S}\right)$$

where $P$ = Pitot pressure and $S$ = static pressure so that:

$$M = F\left(\frac{P-S}{S}\right) \qquad (5)$$

and from Equation 4

$$V_T = CF\left(F\left(\frac{P-S}{S}\right)\right)\sqrt{T_i} \qquad (6)$$

An object of the invention is to provide a Wheatstone bridge circuit comprising one resistance arm variable in dependence on $F(M)$, a diametrically opposite resistance arm variable in dependence on $\sqrt{(T_i)}$ two other resistance arms at least one of which is variable, balance drive means to drive the latter to maintain a balanced condition of the bridge, and true air speed output means driven by said balance drive means.

In accordance with a further object of the invention, the input function of Mach number may be derived from two force balance systems in one of which a beam is acted on by at least one bellows to produce an output proportional to static pressure (S) and in the other of which a beam is acted on by two bellows giving an output proportional to the difference of $(P-S)$.

If desired, the first resistance arm comprises a variable resistance driven proportionally to $M^2$ in parallel with a fixed resistance whose value is proportional to $1/\underline{K}$ of the maximum value of the variable resistance. The resistance of the combination is then proportional to $$\frac{M^2}{1 + M^2 K}$$

This system has the advantage that the effective value of $\underline{K}$ can be varied by changing the value of the fixed resistor.

The invention will now be described by way of example with reference to the accompanying drawings wherein:

FIGURE 3 is a view showing part of an alternative to the apparatus shown in FIGURE 2.

Devices 10, 11 are force balance systems constructed as described in the specification of patent applications Nos. 801,507 and 801,508, now abandoned, each having a pivoted beam acted on in opposite directions about the pivot by two bellows which in device 10 are fed with appropriate pressures P and S to produce a mechanical output movement 12 proportional to $(P-S)$ while in the device 11 one bellows is fed with static pressure while the other bellows is evacuated and sealed so that the device gives a mechanical output movement proportional to S. The mechanical movement in each case is obtained by detecting movement of the beam by an electrical pick-off device which operates an electric motor which drives a lead screw which varies the force of a spring that acts on the beam to restore it to a predetermined position; and the motor simultaneously drives the output 12 (13).

Figure 1:
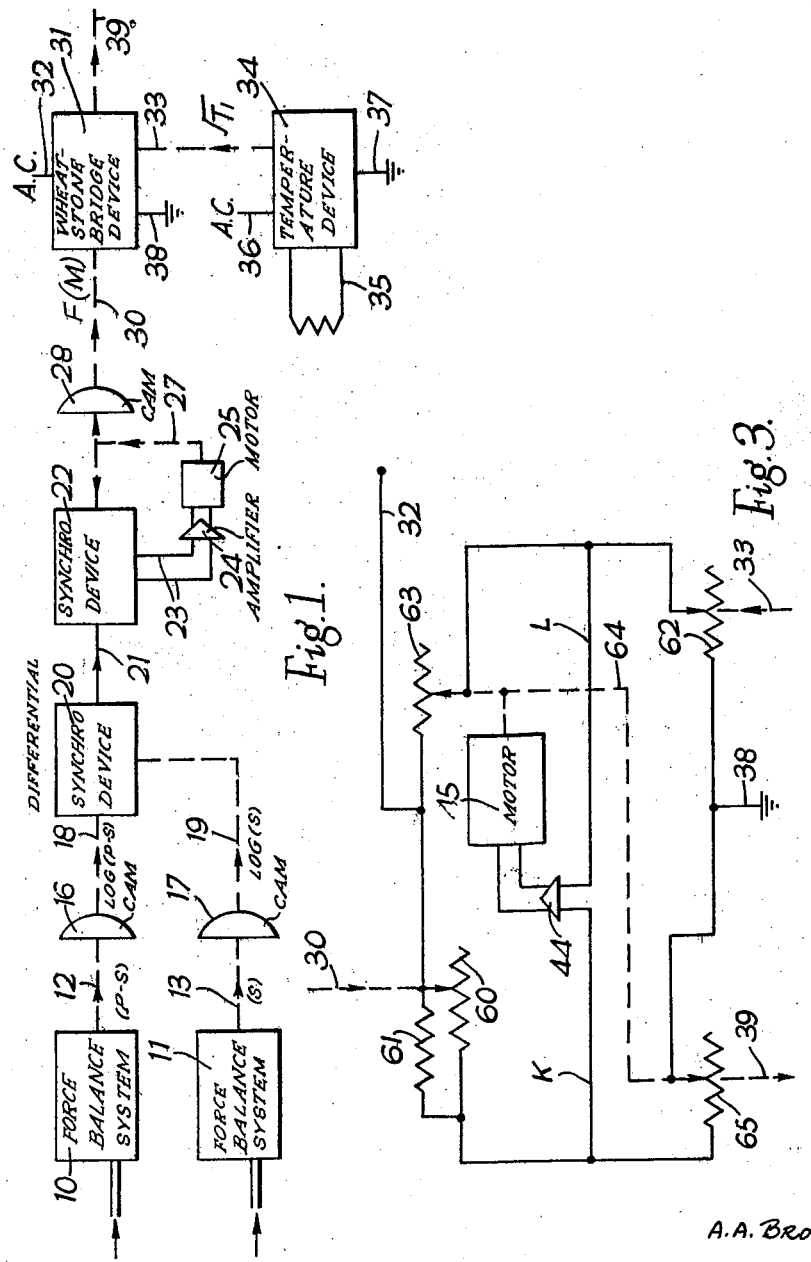
FIGURE 1 is a diagrammatic illustration of a computing apparatus made in accordance with the invention.
Figure 2:
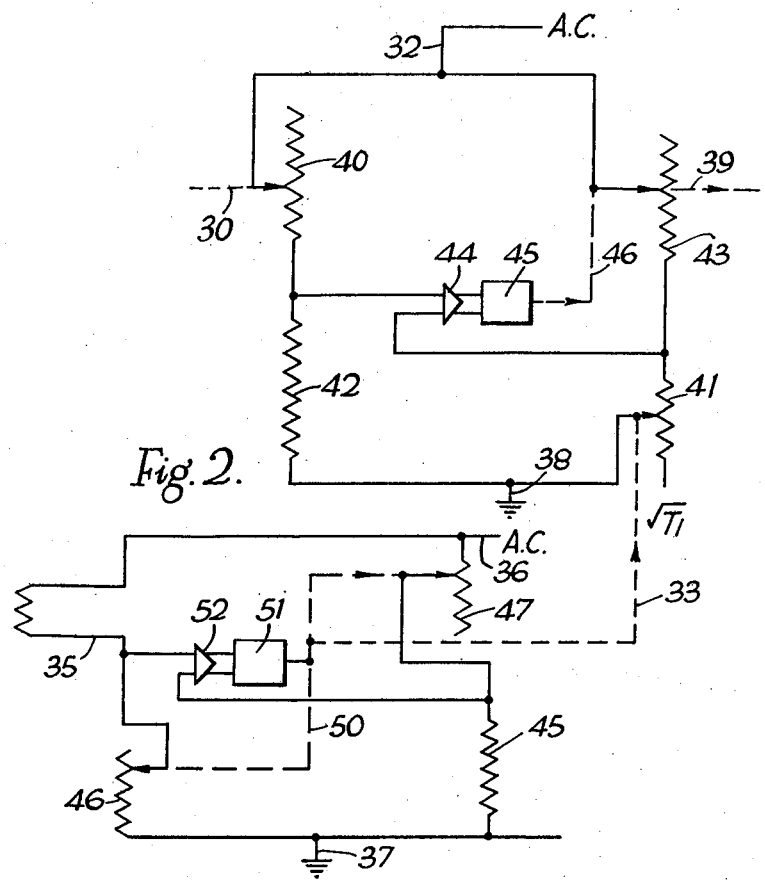
FIGURE 2 is an electrical circuit diagram of parts indicated generally in FIGURE 1.

Referring to FIGURES 1 and 2, the movements 12, 13 are transformed by cams 16, 17 into movements at 18, 19 proportional to log $(P-S)$ and log $S$ which are fed into a differential synchro device 20 of known construction. This gives an electrical output 21 proportional to $$\log \frac{P-S}{S}$$

which is fed to a synchro 22 which has an electrical output 23 amplified by an amplifier 24. The magnified signal operates a motor 25, the shaft of which drives a mechanical connection 27 to the synchro 22 and to a cam 28.

For errors in Pitot static and static pressure measurement which result from the position of the Pitot tube and are functions of Mach number, it is possible to derive single valued functions of these errors, i.e. $\delta(P-S)$ and δS. It is also possible to derive a single valued function δM which is dependent on Mach number and is the result of errors in Pitot static and static pressures. The cam 28 converts log $(P-S)/S$ into $F(M)$ as previously defined in Equation 4a, and provides a compensation for δM. This means that the output 30 is driven according to $F(M)$ as corrected for position error effects. Since these errors vary for different types of aircraft, the computer would be designed so that cam 28 could be easily removed and a replacement cam, suitable for a different type of aircraft, fitted.

The function $F(M)$ is fed at 30 to a Wheatstone bridge device 31 which is supplied at 32 with A.C. voltage, is earthed at 38 and is fed at 33 with a mechanical input proportional to $\sqrt{T_i}$ which is obtained from a temperature bridge device 34 having a temperature probe resistance 35, A.C. voltage supply at 36 and an earth at 37. The bridge device 31 gives a mechanical output 39 of true air speed.

One form of the Wheatstone bridge device 31 and temperature bridge device 34 is shown in FIGURE 2. A variable resistance arm 40 has its slider driven by 30 in proportion to $F(M)$. A diametrically opposite variable resistance arm 41 has its slider driven by 33 in proportion to $\sqrt{(T_i)}$. The other resistance arms of the bridge are a fixed resistance 42 and a variable resistance 43. An amplifier 44 is connected across the bridge to amplify any out-of-balance current in the bridge and the amplifier feeds an electric motor 45, the shaft of which drives a mechanical connection 46 to the slider of the resistance arm 43 and to the output 39. The motor drives the slider of resistance arm 43 always to maintain a balanced condition of the bridge. The value of resistance arm 43 is thus proportional to the product of $F(M)$ and $\sqrt{T_i}$. The product is given as a mechanical rotation at 39 which can drive a synchro or potentiometer or a mechanical integrator giving air miles flown.

The temperature probe resistance 35 also constitutes one resistance arm of a Wheatstone bridge device of which the other resistances are a fixed resistance 45 and variable resistances 46, 47, the slides of which are connected by connection 50 driven by motor 51 which is fed by amplifier 52 connected across the bridge whereby the bridge is constantly adjusted to a balanced condition. The motor 51 simultaneously drives the connection 33. The bridge resistances are selected such as to deduce the square root of the function $T_i$.

In the modification alternative, partly shown in FIGURE 3 the first resistance arm comprises the variable resistance 60 driven proportionally to $M^2$ in parallel with a fixed resistance 61 of such a value that the arm resistance is proportional to $M^2/(1+M^2K)$. A second resistance 62 is driven according to $T_i$. The movable element of the third resistance arm 63 is geared by means 64 to the movable element of the variable fourth resistance arm 65 and the latter drives the true air speed output 39. The movable elements of 63 and 65 are driven by the electric motor 45 which, in turn, is driven by out-of-balance current magnified by the amplifier 44, connected across the bridge. Connections 38, 32 are provided as in FIGURE 2.

For the temperature probe resistance 35 it is possible to use a platinum resistance thermometer.

I claim:

1. A computing apparatus for computing true air speed of an aircraft including two pairs of resistance arms coupled to form a Wheatstone bridge device, the arms of each pair being diametrically opposite each other, the first pair of arms being two drivably variable resistance arms, at least one arm of the second pair of arms being drivably variable, a first transducer means for giving an output variable in dependence on variations in the difference between Pitot pressure (P) and static pressure (S), a second transducer means for giving an output variable in dependence on variations in the static pressure, computing means coupled to the outputs of both the transducer means for deriving a function of Mach number from said pressure difference and the static pressure drivably coupled to one arm of said first pair of arms in the Wheatstone bridge device and adapted to vary it in dependence on $F(M)$ where M is the Mach number and $F(M)$ is given by the equation $$F(M) = \sqrt{\frac{M^2}{1+M^2K}}$$

a temperature sensitive resistance variable in dependence on $T_i$, where $T_i$ is the indicated stagnation temperature, a temperature bridge device having said temperature sensitive resistance as one of its arms, balance means to balance said temperature bridge device and drivably coupled to the other arm of said first pair of arms in the Wheatstone bridge device and adapted to drive this other resistance arm in dependence on $T_i$, in such a manner that the product of the values of said first pair of arms is variable in dependence on $F(M)\sqrt{T_i}$, and balance means adapted to drive the second pair of resistance arms of the Wheatstone bridge device to balance the Wheatstone bridge, the value of said second pair of resistance arms giving a measure of the true air speed.

2. A computing apparatus for computing true air speed of an aircraft including a first and second pair of resistance arms coupled to form a Wheatstone bridge device, the arms of each pair being diametrically opposite each other, the first pair of arms being two drivably variable resistance arms, while the second pair of arms is formed by a fixed resistance arm and a third drivably variable resistance arm, a first transducer means for giving an output variable in dependence on variations in the difference between Pitot pressure (P) and static pressure (S), a second transducer means for giving an output variable in dependence on variations in the static pressure, computing means coupled to the outputs of both the transducer means for deriving a function of Mach number from said pressure difference and the static pressure and drivably coupled to one arm of said first pair of arms in the Wheatstone bridge device and adapted to vary said one arm in proportion to $F(M)$ where M is the Mach number and $F(M)$ is given by the equation $$F(M) = \sqrt{\frac{M^2}{1+M^2K}}$$

a temperature sensitive resistance variable in dependence on $T_i$, where $T_i$ is the indicated stagnation temperature, a temperature bridge device having said temperature sensitive resistance as one of its arms, balance means to balance said temperature bridge device and drivably coupled to the other arm of said first pair of arms in the Wheatstone bridge device and adapted to drive this other resistance arm in proportion to $\sqrt{T_i}$, and balance means adapted to drive the third variable resistance arm of the Wheatstone bridge device to balance the Wheatstone bridge, the value of said third variable resistance arm giving a measure of the true air speed.

3. A computing apparatus for computing true air speed of an aircraft including a first and second pair of drivably variable resistance arms coupled to form a Wheatstone bridge device, the arms of each pair being diametrically opposite each other, a first transducer means for giving an output variable in dependence on variations in the difference between Pitot pressure (P) and static pressure (S), a second transducer means for giving an output variable in dependence on variations in the static pressure, computing means coupled to the outputs of both the transducer means for deriving a function of Mach number from said pressure difference and the static pressure and drivably coupled to one arm of said first pair of resistance arms in the Wheatstone bridge device and adapted to vary said one arm in proportion to $F^2(M)$ where M is the Mach number and F(M) is given by the equation $$F(M) = \sqrt{\frac{M^2}{1+M^2K}}$$

a temperature sensitive resistance variable in dependence on $T_i$, where $T_i$ is the indicated stagnation temperature, a temperature bridge device having said temperature sensitive resistance as one of its arms, balance means to balance said temperature bridge device and drivably coupled to the other arm of said first pair of arms in the Wheatstone bridge device to drive this other resistance arm in proportion to $T_i$, and balance means adapted to drive simultaneously the second pair of drivably variable resistance arms of the Wheatstone bridge device to balance the Wheatstone bridge in such a manner that the values of said second pair of drivably variable resistance arms give a measure of the true air speed.

4. A computing apparatus for computing true air speed of an aircraft including a first and second pair of resistance arms coupled to form a Wheatstone bridge device, the arms of each pair being diametrically opposite each other, the first pair of arms being two drivably variable resistance arms while the second pair of arms is formed by a fixed resistance arm and a third drivably variable resistance arm, a first force balance device for giving an output variable in dependence on variations in the difference between Pitot pressure (P) and static pressure (S), first cam means, coupled to the output of the first force balance device and profiled to give an output proportional to the logarithm of said pressure difference, a second force balance device for giving an output variable in dependence on variations in the static pressure, second cam means coupled to the output of said second force balance device and profiled to give an output proportional to the logarithm of said static pressure, a differential synchro device fed by both said first and second cam means to give an output proportional to $$\log\left(\frac{P-S}{S}\right)$$

and third cam means driven by the differential synchro and profiled to give an output function of Mach number from said output of the differential synchro device, said third cam means being drivably coupled to one of said first pair of resistance arms in the Wheatstone bridge device and adapted to vary said one arm in proportion to F(M) where M is the Mach number and F(M) is given by the equation $$F(M) = \sqrt{\frac{M^2}{1+M^2K}}$$

a temperature sensitive resistance variable in dependence on $T_i$, where $T_i$ is the indicated stagnation temperature, a temperature bridge device having said temperature sensitive resistance as one of its arms, balance means to balance said temperature bridge device and drivably coupled to the other of said first pair of resistance arms in the Wheatstone bridge device to drive this other resistance arm in proportion to $\sqrt{T_i}$, and balance means adapted to drive said third variable resistance arm forming one arm of said second pair of arms in the Wheatstone bridge device to balance the Wheatstone bridge, the value of said third variable resistance arm giving a measure of the true air speed.

5. A computing apparatus for computing true air speed of an aircraft including a fixed resistance in parallel with a drivably variable resistance to form a first resistance arm and second, third and fourth drivably variable resistance arms, the four resistance arms being coupled to form a Wheatstone bridge device with the second resistance arm diametrically opposite the first resistance arm, a first force balance device for giving an output variable in dependence on variations in the difference between Pitot pressure (P) and static pressure (S), first cam means, coupled to the output of the first force balance device and profiled to give an output proportional to the logarithm of said pressure difference, a second force balance device for giving an output variable in dependence on variations in the static pressure, second cam means coupled to the output of said second force balance device and profiled to give an output proportional to the logarithm of said static pressure, a differential synchro device fed by the outputs of both said first and second cam means to give an output proportional to $$\log\left(\frac{P-S}{S}\right)$$

and third cam means given by the differential synchro and profiled to give an output function of Mach number from said output of the differential synchro device, said third cam means being drivably coupled to the variable resistance of said first resistance arm in the Wheatstone bridge device, and adapted to vary the variable resistance of said first arm in proportion to $M^2$, where M is the Mach number and the fixed resistance of said first arm being of such a value that the value of the first resistance arm is proportional to $F^2(M)$, where F(M) is given by the equation $$F(M) = \sqrt{\frac{M^2}{1+M^2K}}$$

a temperature sensitive resistance variable in dependence on $T_i$, where $T_i$ is the indicated stagnation temperature, a temperature bridge device having said temperature sensitive resistance as one of its arms, balance means to balance said temperature bridge device and drivably coupled to said second resistance arm opposite said first resistance arm in the Wheatstone bridge device to drive the second resistance arm in proportion to $T_i$, and balance means adapted to drive simultaneously the third and fourth resistance arms of the Wheatstone bridge device to balance the Wheatstone bridge in such a manner that the square root of the product of the values of said third and fourth drivably variable resistance arms is proportional to the true air speed.

6. A computing apparatus for computing true air speed of an aircraft including a first and second pair of resistance arms coupled to form a first Wheatstone bridge device, the arms of each pair being diametrically opposite each other, the first pair of arms being two drivably variable resistance arms, while the second pair of arms is formed by a fixed resistance arm and a third drivably variable resistance arm, a first force balance device for giving an output variable in dependence on variations in the difference between Pitot pressure (P) and static pressure (S), first cam means, coupled to the output of the first force balance device and profiled to give an output proportional to the logarithm of said pressure difference, a second force balance device for giving an output variable in dependence on variations in the static pressure, second cam means coupled to said second force balance device and profiled to give an output proportional to the logarithm of said static pressure, a differential synchro device fed by both said first and second cam means to give an output proportional to $$\log\left(\frac{P-S}{S}\right)$$

and third cam means driven by the differential synchro and profiled to give an output function of Mach No. from said output of the differential synchro device, said third cam means being drivably coupled to one of said first pair of resistance arms in the Wheatstone bridge device and adapted to vary said one arm in proportion to F(M) where M is the Mach number and F(M) is given by the equation $$F(M) = \sqrt{\frac{M^2}{1+M^2K}}$$

a temperature sensitive resistance variable in proportion to $T_i$, where $T_i$ is the indicated stagnation temperature, two drivably variable resistances and a fixed resistance connected with the temperature sensitive resistance so that each of the resistances forms an arm of a Wheatstone temperature bridge device with said temperature sensitive resistance arm opposite the fixed resistance arm, balance means coupled to both the drivably variable resistance arms of the temperature bridge device and adapted to balance said temperature bridge device and drivably coupled to the other of the first pair of resistance arms in said first Wheatstone bridge device to drive this other resistance arm in proportion to $\sqrt{T_i}$, and balance means adapted to drive the third variable resistance arm of said first Wheatstone bridge device to balance the Wheatstone bridge, the value of said third variable resistance arm giving a measure of the true air speed.

7. A computing apparatus for computing true air speed of an aircraft including a fixed resistance in parallel with a drivably variable resistance to form a first resistance arm and second, third and fourth drivably variable resistance arms, the four resistance arms being coupled to form a Wheatstone bridge device with the second resistance arm diametrically opposite the first resistance arm, a first force balance device for giving an output variable in dependence on variations in the difference between Pitot pressure (P) and static pressure (S), first cam means, coupled to the output of the first force balance device and profiled to give an output proportional to the logarithm of said pressure difference, a second force balance for giving an output variable in dependence on variations in the static pressure, second cam means coupled to said second force balance device and profiled to give an output proportional to the logarithm of said static pressure, a differential synchro device fed by both said first and second cam means to give an output proportional to $$\log \left(\frac{P-S}{S}\right)$$

and third cam means driven by the differential synchro and profiled to give an output function of Mach number from said output of the differential synchro device, said third cam means being drivably coupled to the variable resistance of said first resistance arm in the Wheatstone bridge device and adapted to vary the variable resistance of said first arm in proportion to $M^2$, where M is the Mach number and the fixed resistance of said first arm being of such a value that the value of the first resistance arm is proportional to $F^2(M)$, where $F(M)$ is given by the equation $$F(M) = \sqrt{\frac{M^2}{1+M^2K}}$$

a temperature sensitive resistance variable in proportion to $T_i$, where $T_i$ is the indicated stagnation temperature, a temperature bridge device having said temperature sensitive resistance as one of its arms, balance means to balance said temperature bridge device and drivably coupled to said second resistance arm in the Wheatstone bridge device to drive this second resistance in proportion to $T_i$, and balance means adapted to drive simultaneously the third and fourth resistance arms of the Wheatstone bridge device to balance the Wheatstone bridge in such a manner that the square root of the product of the values of said third and fourth drivably variable resistance arms of said first Wheatstone bridge is proportional to the true air speed.

References Cited in the file of this patent
UNITED STATES PATENTS

| | | |
|---|---|---|
| 2,584,897 | Marco | Feb. 5, 1952 |
| 2,869,367 | Moore | Jan. 20, 1959 |

FOREIGN PATENTS

| | | |
|---|---|---|
| 625,023 | Great Britain | June 21, 1949 |